(12) United States Patent
Watanabe et al.

(10) Patent No.: US 8,506,006 B2
(45) Date of Patent: Aug. 13, 2013

(54) TRUCK FRAME FOR CONSTRUCTION MACHINE

(75) Inventors: Masanori Watanabe, Tsuchiura (JP); Yoshio Namai, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 45 days.

(21) Appl. No.: 13/128,156

(22) PCT Filed: Feb. 24, 2010

(86) PCT No.: PCT/JP2010/052890
§ 371 (c)(1),
(2), (4) Date: May 6, 2011

(87) PCT Pub. No.: WO2010/101059
PCT Pub. Date: Oct. 9, 2010

(65) Prior Publication Data
US 2011/0210583 A1    Sep. 1, 2011

(30) Foreign Application Priority Data
Mar. 4, 2009  (JP) .................................. 2009-50616

(51) Int. Cl.
*B62D 21/00* (2006.01)
*B62D 55/00* (2006.01)

(52) U.S. Cl.
USPC ........................ 296/203.01; 296/204; 280/781

(58) Field of Classification Search
USPC .......... 296/30, 190.05, 203.01, 204; 280/781, 280/785, 790, 792, 793, 797, 798, 800; 180/89.12, 89.13; 37/379, 397, 443
See application file for complete search history.

(56) References Cited

U.S. PATENT DOCUMENTS
4,397,481 A * 8/1983 Dion et al. .................... 280/781

FOREIGN PATENT DOCUMENTS
| | | |
|---|---|---|
| JP | 59-140370 U | 9/1984 |
| JP | 5-81357 U | 5/1993 |
| JP | 10-306466 A | 11/1998 |
| JP | 11-071785 A | 3/1999 |

OTHER PUBLICATIONS

Hitachi Construction Machine Company, Japanese Patent Publication 11-071785, machine translation from Japanese to English retreived via the Industrial Property Digital Library website, http://www.ipdl.inpit.go.jp/homepg_e.ipdl, on Dec. 17, 2012.*

* cited by examiner

*Primary Examiner* — Glenn Dayoan
*Assistant Examiner* — Jason S Daniels
(74) *Attorney, Agent, or Firm* — Mattingly & Malur, PC (57) ABSTRACT

A frame for use in a construction machine such as a hydraulic excavator, in which a circle member (18) for mounting a swing circle to a center frame is secured. An outer curved portion (21A) with a recessed groove shape is provided over the entire circumference in a vertically intermediate portion of the outer peripheral surface of the circle member, and an inner curved portion (21B) with a recessed groove shape is provided over the entire circumference in a vertically intermediate portion of the inner peripheral surface of the circle member to thereby make it possible to render small the plate thickness (t) of the hourglass-shaped thin-walled portion (21) located in the vertically intermediate portion relative to the plate thickness (T) of upper and lower thick-walled portions (19, 20) located on both vertical end sides of the circle member. Consequently, the weight of the circle member can be reduced.

3 Claims, 6 Drawing Sheets

PRIOR ART

TRUCK FRAME FOR CONSTRUCTION MACHINE

TECHNICAL FIELD

The present invention relates to a truck frame for use in a construction machine such as a hydraulic excavator, a hydraulic crane, or the like, and more particularly to a truck frame for a construction machine to which a circle member for mounting a swing circle to a center frame is secured.

BACKGROUND ART

Generally, a hydraulic excavator, a hydraulic crane, or the like as a construction machine is largely constituted by an automotive lower traveling structure, an upper revolving structure mounted swingably on the lower traveling structure, and a working mechanism provided on the front side of the upper revolving structure.

In this instance, the truck frame which constitutes a main body portion of the lower traveling structure consists of left and right side frames and a center frame disposed between the side frames. The center frame is largely constituted by a top plate and a bottom plate which are connected to the left and right side frames at an interval provided therebetween in the vertical direction, a connecting tubular body provided between intermediate portions in the left and right directions of the top plate and bottom plate to connect the two plates, and a cylindrical circle member secured to an upper surface side of the top plate. Further, a swing circle is mounted on an upper end side of the circle member by means of bolts or the like, and the upper revolving structure is arranged to be swingably supported on the truck frame through the swing circle.

Here, the circle member which is secured on top of the center frame of the truck frame is generally formed into a cylindrical shape by bending rolled steel for general structure into a round shape, and a lower end portion of the circle member is secured to an upper surface side of the top plate for constituting the center frame by means of a welding means. A plurality of bolt holes (female screw holes) are threadedly provided in the upper end portion of the circle member over its entire circumference, and the swing circle is arranged to be mounted on the upper end portion of the circle member by use of the bolts which are threadedly inserted into these bolt holes.

In this instance, the circle member in accordance with a prior art is formed as a cylindrical body with a uniform plate thickness in the vertical (axial) direction in which the plate thickness is set to be equal from the upper end portion where the plurality of bolt holes are threadedly provided to the lower end portion which is welded to the center frame (Patent Literature 1: Japanese Patent Laid-Open No. Hei 10-306466 A).

Meanwhile, as the circle member in accordance with another prior art, the circle member which is used in a large size hydraulic excavator for use in, for example, the open-pit mining of minerals is formed into a stepped cylindrical shape by a cylindrical portion and a flange portion expanding to radially outward from a lower end side of the cylindrical portion. Further, this circle member constituted by the cylindrical portion and the flange portion is so arranged that a boundary portion between the cylindrical portion and the flange portion is cut out over the entire circumference into a recessed curved shape to thereby minimize the concentration of stress at the boundary portion between the two portions (Patent Literature 2: Japanese Patent Laid-Open No. Hei 11-71785 A).

SUMMARY OF THE INVENTION

Incidentally, with the aforementioned circle member according to the prior art of Patent Literature 1, in order to secure a sufficient plate thickness around the bolt holes threadedly provided in its upper end portion, it is necessary to enlarge (thicken) the plate thickness of the upper end side, but a plate thickness as large as that of the upper end side is not required for the lower end side which is welded to the center frame. For this reason, with the circle member according to the prior art, the plate thickness of this lower end side is larger than is required, so that there is a problem in that the overall weight of the circle member unfavorably increases.

In addition, in the prior art of Patent Literature 1, the plate thickness of the circle member is set to a dimension which is more than two times larger than the plate thickness of the top plate of the center frame to which the circle member is welded. For this reason, a large difference arises between the strength of the top plate and the strength of the circle member, so that when the circle member is secured to the top plate by a welding means, a large stress is unfavorably generated at a joint portion between the two members.

To cope with this, in order to reduce the stress generated at the joint portion between the circle member whose plate thickness is large and the top plate whose plate thickness is small, there is known a method in which the leg length of a weld bead which is formed at the joint portion between the lower end portion of the circle member and the top plate is made large, and the surface of the weld bead is ground into an arcuate shape by using a grinder or the like, or another method in which the bead is formed as a recessed bead without grinding the bead. According to such a method, however, much time is expended in the operation of welding the circle member to the top plate of the center frame, so that there is a problem in that the operational efficiency disadvantageously declines.

On the other hand, the circle member consisting of the cylindrical portion and the flange portion as in the prior art of Patent Literature 2 has a problem in that since a circular plate-shaped flange portion is provided over the entire circumference at the lower end side of the thick-walled lower end side, the weight of the circle member disadvantageously increases substantially.

In view of the above-discussed problems with the prior art, it is an object to provide a truck frame for a construction machine which is capable of reducing the weight of the circle member and enhancing the operational efficiency at the time of welding the circle member to the top plate of the center frame.

(1) In order to solve the above-described problems, the present invention is applied to a truck frame for a construction machine including left and right side frames and a center frame disposed between the side frames, and the center frame being constituted by a top plate and a bottom plate which are connected to the left and right side frames at an interval in a vertical direction, a connecting tubular body provided between intermediate portions in left and right directions of the top plate and the bottom plate to connect the top plate and the bottom plate, and a cylindrical circle member which is secured to an upper surface side of the top plate and on an upper end side of which a swing circle is mounted.

The characteristic feature of the construction adopted in the present invention lies in that: an outer curved portion is provided in an outer peripheral surface of the circle member, the outer curved portion being located in a vertically intermediate portion and formed by cutting out into a recessed groove shape over an entire circumference, and an inner curved portion is provided in an inner peripheral surface of the circle member, the inner curved portion being located in a vertically intermediate portion and is formed by cutting out into a recessed groove shape over an entire circumference.

As the outer curved portion and the inner curved portion which are formed in a recessed groove shape are provided in the vertically intermediate portion of the circle member, the plate thickness of the intermediate portion of the circle member can be small (thin), so that the overall weight of the circle member can be reduced by this portion.

Further, as the outer curved portion is provided on the outer peripheral side of the circle member, and the inner curved portion is provided on the inner peripheral side, when a vertical load is applied to the circle member, stress can be dispersed to the outer curved portion and the inner curved portion of the circle member. In consequence, when the lower end portion of the circle member is joined to the top plate of the center frame by using a welding means, it is possible to minimize the generation of localized stress concentration at the joint portion between them. As a result, since the leg length of the weld bead which is formed over the entire circumference between the circle member and the top plate can be made small, it is possible to enhance the operational efficiency at the time of welding the circle member to the top plate, thereby making it possible to contribute to the reduction of the manufacturing cost of the truck frame.

(2) According to the present invention, the circle member is formed such that its upper end side is formed as an upper thick-walled portion, its lower end side is formed as a lower thick-walled portion, and a portion between the thick-walled portions is formed as an hourglass-shaped thin-walled portion enclosed by the outer curved portion and the inner curved portion.

By virtue of this construction, a plate thickness required for threadedly providing bolt holes (female screw holes) for mounting the swing circle can be secured at the upper end side of the circle member. Thus, as the upper end side and the lower end side of the circle member are formed as thick-walled portions, and the intermediate portion is formed as the thin-walled portion, the overall weight of the circle member can be reduced while sufficiently attaining its function as the circle member.

(3) According to the present invention, each of the outer curved portion and the inner curved portion is constituted by a rectilinear portion extending rectilinearly along a center line of a plate thickness of the circle member, an upper arcuate portion connecting between the rectilinear portion and the upper thick-walled portion curvilinearly, and a lower arcuate portion connecting between the rectilinear portion and the lower thick-walled portion curvilinearly.

According to this construction, the plate thickness of the thin-walled portion of the circle member can be set to be small by the rectilinear portion of the outer curved portion and the rectilinear portion of the inner curved portion. As this rectilinear portion and each of the upper and lower thick-walled portions are connected curvilinearly by the arcuate portion, it is possible to minimize the occurrence of localized stress concentration at a boundary portion between the thick-walled portion located at each vertical end side of the circle member and the thin-walled portion located in the intermediate portion. As a result, it is possible to ensure the overall strength of the circle member in which the plate thickness on the both vertical end sides is large and the plate thickness at the vertically intermediate portion is small, thereby making it possible to enhance its reliability.

(4) According to the present invention, the lower thick-walled portion of the circle member and the top plate are welded by a welding means, and a weld bead at this joint portion is formed continuously with the outer curved portion.

According to this construction, it is possible to minimize the concentration of stress with respect to the upper stop end portion of the weld bead, which is joined to the lower thick-walled portion of the circle member, and the lower stop end portion of the weld bead, which is joined to the top plate of the center frame, thereby making it possible to enhance the joining strength of the circle member with respect to the top plate.

BRIEF DESCRIPTION OF THE DRAWINGS

In the accompanying drawings.

MODE FOR CARRYING OUT THE INVENTION

Hereinafter, an embodiment of a truck frame for a construction machine in accordance with the present invention is described more particularly with reference to the accompanying drawings, by citing as an example a case where the truck frame for a construction machine is applied to a hydraulic excavator.

Figure 1:
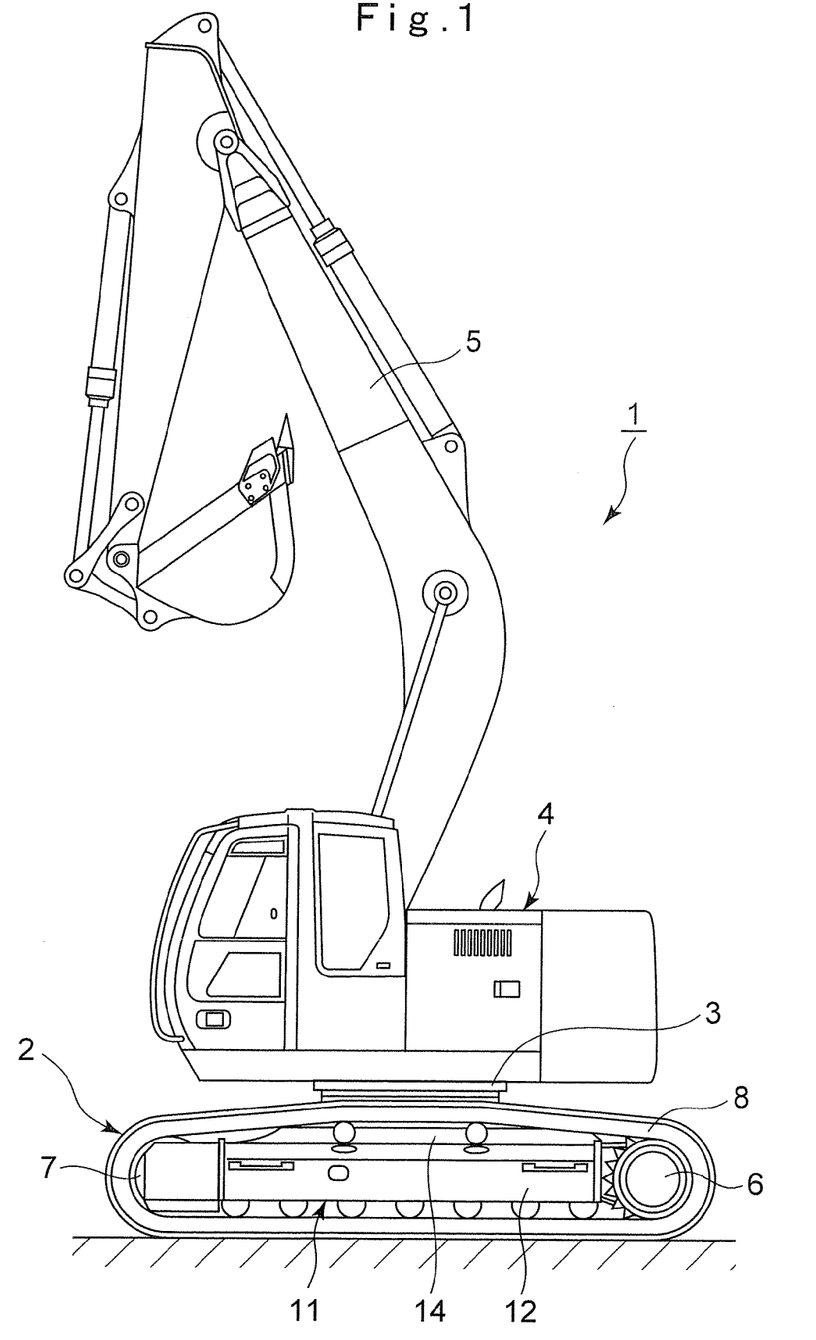
FIG. 1 is a front elevational view illustrating a hydraulic excavator to which the truck frame in accordance with an embodiment of the present invention is applied.

In the drawings, designated at 1 is a hydraulic excavator as a typical example of the construction machine. This hydraulic excavator 1 is largely constituted by an automotive crawler type lower traveling structure 2, an upper revolving structure 4 mounted swingably on the lower traveling structure 2 through a swing circle 3, and a working mechanism 5 provided liftably on the front side of the upper revolving structure 4, and is used in such as the operation of excavating earth and sand.

The crawler type lower traveling structure 2 is for traveling on irregular road surfaces of such as construction sites, and is largely constituted by a below-described truck frame 11, drive wheels 6 which are driven by a traveling hydraulic motor (not shown) provided on one end sides of below-described left and right side frames 12 and 13, idler wheels 7 provided rotatably on the opposite end sides of the left and right side frames 12 and 13, and crawler belts (crawlers) 8 respectively provided by being wound around each of the drive wheel 6 and the idler wheel 7.

Figure 2:
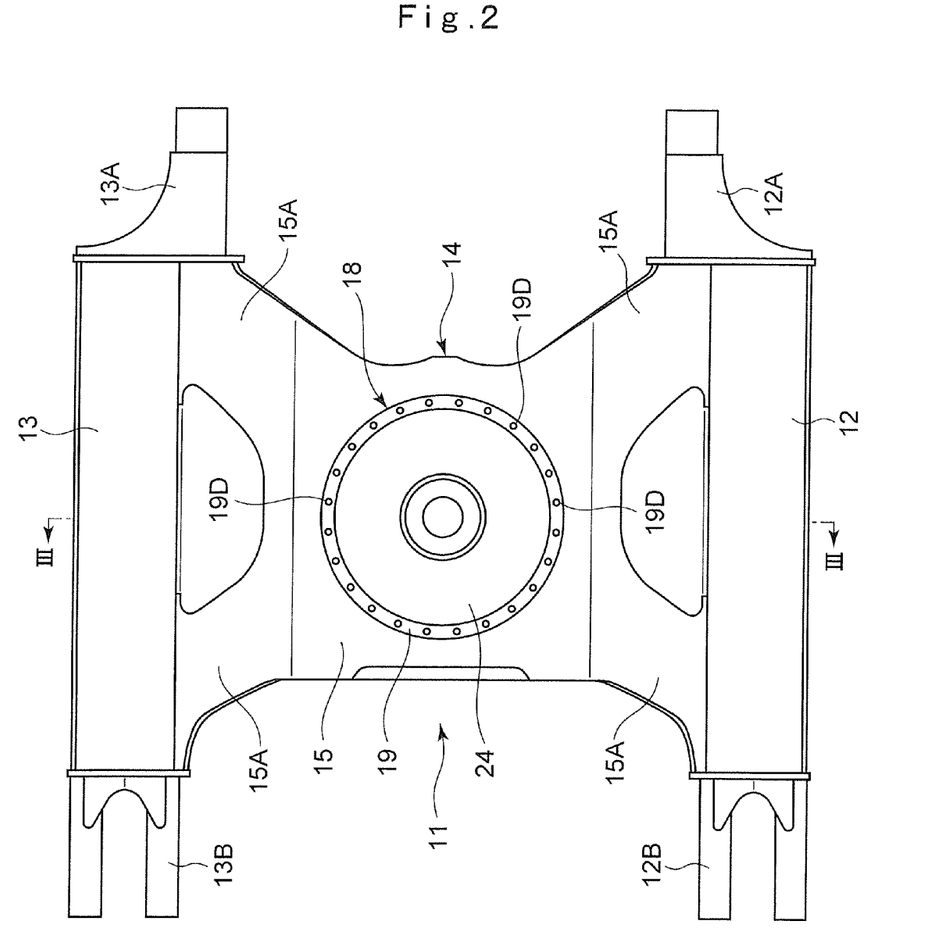
FIG. 2 is a plan view illustrating the truck frame.
Figure 3:
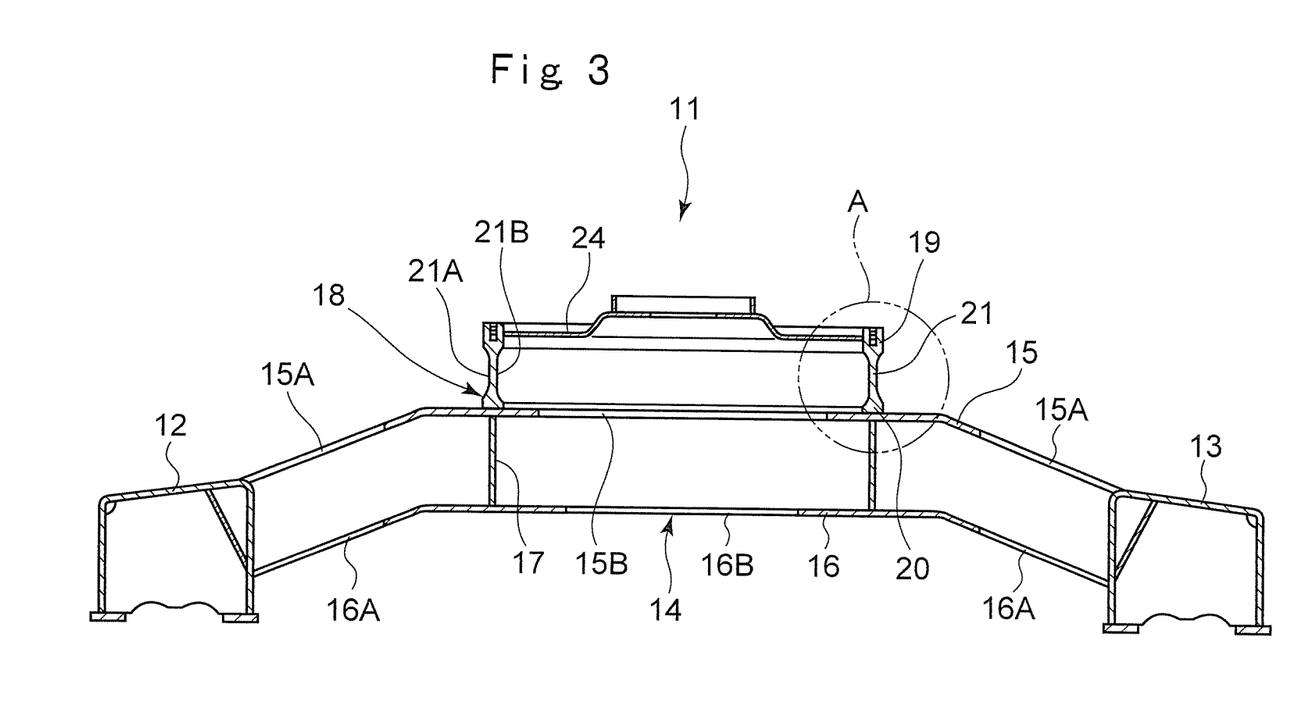
FIG. 3 is a cross-sectional view of the truck frame, taken from the direction of arrows III-III in FIG. 2.

Designated at 11 is the truck frame serving as a main body portion of the lower traveling structure 2. As shown in FIGS. 2 and 3, the truck frame 11 is largely constituted by the left and right side frames 12 and 13 and a below-described center frame 14 disposed between these left and right side frames 12 and 13.

Here, the left side frame 12 is arranged in such a manner as to extend in the front and rear directions, and is welded to distal end sides of a leg portion 15A of a top plate 15 and a leg portion 16A of a bottom plate 16, which will be described hereinafter. Further, the left side frame 12 is formed into an inverse U-shaped cross-sectional shape with its lower end side open by subjecting a steel plate to bending, a drive wheel bracket 12A being mounted on one longitudinal end side thereof, and an idler wheel bracket 12B being mounted on the other end side thereof.

Meanwhile, the right side frame 13 is arranged in such a manner as to extend in the front and rear directions, and is welded to distal end sides of the leg portion 15A of the top plate 15 and the leg portion 16A of the bottom plate 16, which will be described hereinafter. Further, the right side frame 13 is formed into an inverse U-shaped cross-sectional shape with its lower end side open by subjecting a steel plate to bending, a drive wheel bracket 13A being mounted on one longitudinal end side thereof, and an idler wheel bracket 13B being mounted on the other end side thereof.

Denoted at 14 is the center frame disposed between the left and right side frames 12 and 13. The center frame 14 is formed substantially in an X-shape as viewed from above and constitutes a central portion of the truck frame 11. Here, the center frame 14 is constituted by the top plate 15, the bottom plate 16, a circle member 18, and the like which will be described hereinafter.

Indicated at 15 is the top plate of the center frame 14, and the top plate 15 is formed substantially in an X-shape by using a steel plate or the like. A total of four leg portions 15A are provided on both left and right sides of the top plate 15, two each on the respective side in such a manner as to be spaced apart in the front and rear directions. Further, the distal end side of the left leg portion 15A is connected to the left side frame 12 by using a welding means, while the distal end side of the right leg portion 15A is connected to the right side frame 13 by using a welding means. While, a large-diameter operation hole 15B is formed in a central portion of the top plate 15, and the below-described circle member 18 is arranged to be secured to an upper surface side of the top plate 15 in such a manner as to surround the operation hole 15B.

Indicated at 16 is the bottom plate disposed below the top plate 15 at an interval provided therebetween in the vertical direction. In the same way as the top plate 15, the bottom plate 16 is also formed substantially in an X-shape by using a steel plate or the like. A total of four leg portions 16A are provided on both left and right sides of the bottom plate 16, two each on the respective side in such a manner as to be spaced apart in the front and rear directions. Further, the distal end side of the left leg portion 16A is connected to the left side frame 12 at a position spaced apart downwardly from the leg portion 15A of the top plate 15 by using a welding means, while the distal end side of the right leg portion 16A is connected to the right side frame 13 at a position spaced apart downwardly from the leg portion 15A of the top plate 15 by using a welding means. While, a large-diameter operation hole 16B is formed in a central portion of the bottom plate 16 concentrically with the operation hole 15B of the top plate 15.

Indicated at 17 is a connecting tubular body constituted by a cylindrical body provided between intermediate portions in the left and right directions of the top plate 15 and the bottom plate 16. This connecting tubular body 17 is disposed concentrically with the operation hole 15B of the top plate 15 and the operation hole 16B of the bottom plate 16, and the upper end side of the connecting tubular body 17 is secured to the lower surface of the top plate 15 by using a welding means, while the lower end side of the connecting tubular body 17 is secured to the upper surface of the bottom plate 16 by using a welding means. In consequence, the top plate 15 and the bottom plate 16 are connected by the connecting tubular body 17 at a fixed interval provided therebetween in the vertical direction.

Next, a specific construction of the circle member 18 which is used in this embodiment will be explained.

Namely, designated at 18 is the circle member secured to the upper surface side of the top plate 15 for constituting the center frame 14. This circle member 18 is fabricated by using, for example, a casting means, and is formed into a thick-walled cylindrical shape which has an outside diameter dimension slightly larger than that of the connecting tubular body 17 which is cylindrical as a whole, and has a greater plate thickness than the connecting tubular body 17.

Figure 4:
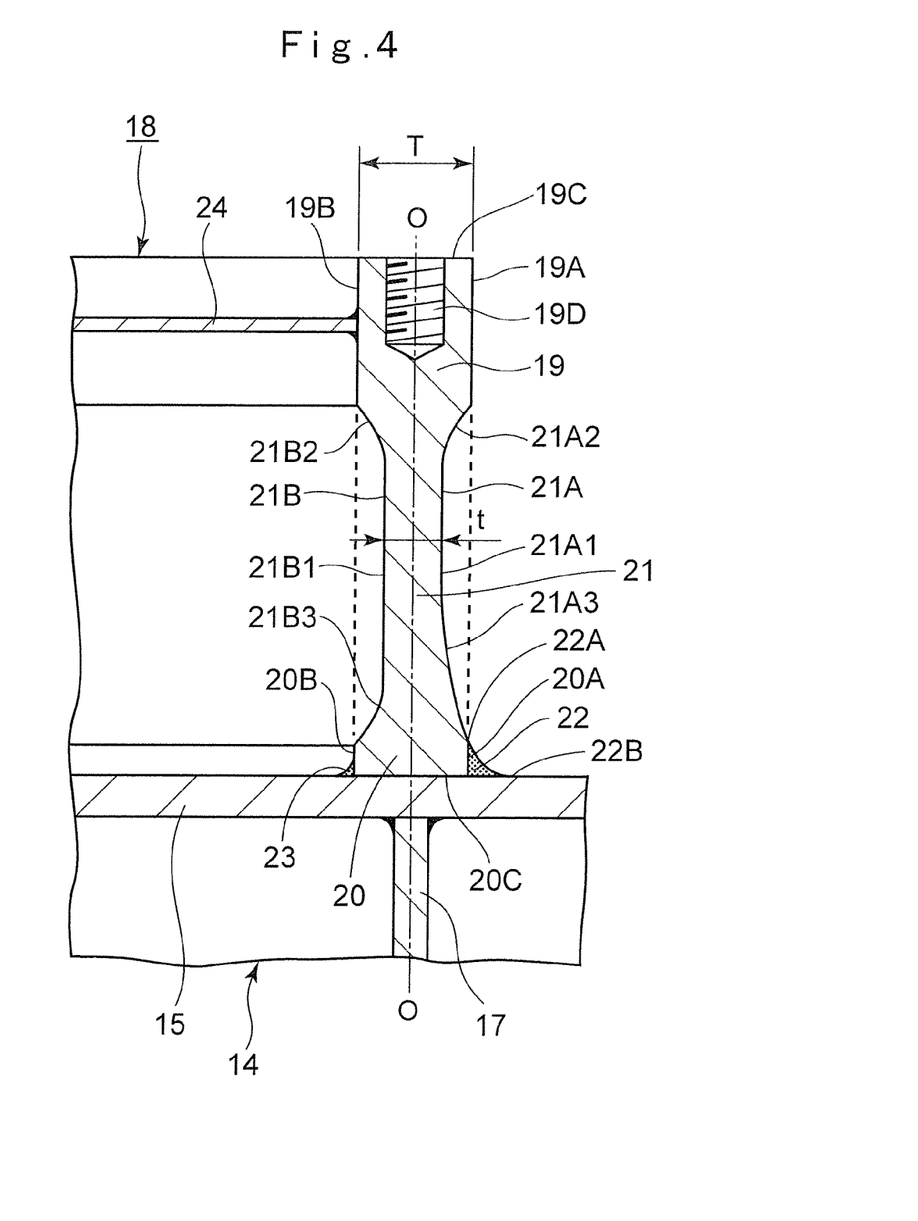
FIG. 4 is an enlarged cross-sectional view of an essential portion, illustrating in enlarged form a portion A in FIG. 3.

The circle member 18 is disposed above the connecting tubular body 17 with the top plate 15 interposed therebetween, and its lower end portion over its entire circumference is joined to the top plate 15 by the welding means. As shown in FIG. 4, as for the circle member 18, its upper end side is formed as an upper thick-walled portion 19, its lower end side is formed as a lower thick-walled portion 20, and a portion between the upper thick-walled portion 19 and the lower thick-walled portion 20 is formed as a below-described hourglass-shaped thin-walled portion 21.

Here, the upper thick-walled portion 19 of the circle member 18 is formed by an upper thick-walled portion outer peripheral surface 19A located on an outer peripheral side, an upper thick-walled portion inner peripheral surface 19B located on an inner peripheral side, and an upper end surface 19C. A plurality of bolt holes (female screw holes) 19D are threadedly provided in the upper end surface 19C of the upper thick-walled portion 19 at equal intervals in the circumferential direction, and the swing circle 3 is arranged to be mounted on the upper end side of the circle member 18 by using bolts (not shown) which are threadedly inserted in these bolt holes 19D.

Meanwhile, the lower thick-walled portion 20 of the circle member 18 is formed by a lower thick-walled portion outer peripheral surface 20A located on an outer peripheral side, a lower thick-walled portion inner peripheral surface 20B located on an inner peripheral side, and a lower end surface 20C. An outer peripheral edge and an inner peripheral edge of the lower end surface 20C of the lower thick-walled portion 20 are welded over the entire circumference to the top plate 15 of the center frame 14. An outer weld bead 22 and an inner weld bead 23, which will be described hereinafter, are arranged to be formed between the lower end surface 20C of the lower thick-walled portion 20 and the top plate 15.

In this instance, each of the upper thick-walled portion 19 and the lower thick-walled portion 20 has a large plate thickness T, and the each bolt hole 19D for mounting the swing circle 3 is provided on a center line O-O of this plate thickness T. In addition, the vertical lengthwise dimension (heightwise dimension) of the upper thick-walled portion 19 is set to be larger than the vertical lengthwise dimension (depthwise dimension) of each bolt hole 19D. The arrangement provided is such that as the upper thick-walled portion 19 having the large plate thickness T is thus provided on the upper end side of the circle member 18, the strength of peripheries of the each bolt hole 19D for mounting the swing circle 3 is ensured.

Denoted at 21 is the hourglass-shaped thin-walled portion which is provided in an hourglass shape between the upper thick-walled portion 19 and the lower thick-walled portion 20, and the hourglass-shaped thin-walled portion 21 has a smaller (thinner) plate thickness t than the plate thickness of each of the upper and lower thick-walled portions 19 and 20 (t<T). The hourglass-shaped thin-walled portion 21 is formed over the entire circumference in a vertically intermediate portion of the circle member 18 in such a manner as to be enclosed by an outer curved portion 21A and an inner curved portion 21B, which will be described hereinafter. It should be noted that, as for the plate thickness t of the hourglass-shaped thin-walled portion 21, the thicknesswise dimension varies between the upper and lower thick-walled portions 19 and 20 depending on the location. Further, between below-described rectilinear portions 21A1 and 21B1, the plate thickness t is substantially fixed and is thinnest.

Denoted at 21A is the outer curved portion provided in the vertically (axially) intermediate portion of the outer peripheral surface of the circle member 18. The outer curved portion 21A is formed by cutting out a portion between the upper thick-walled portion outer peripheral surface 19A of the upper thick-walled portion 19 and the lower thick-walled portion outer peripheral surface 20A of the lower thick-walled portion 20 into a recessed groove shape over the entire circumference, and constitutes an outer peripheral surface of the hourglass-shaped thin-walled portion 21.

Here, the outer curved portion 21A is constituted by the rectilinear portion 21A1 located vertically intermediately and extending rectilinearly along the center line O-O of the plate thickness T of the circle member 18; an upper arcuate portion 21A2 connecting between an upper end side of the rectilinear portion 21A1 and the upper thick-walled portion outer peripheral surface 19A of the upper thick-walled portion 19 curvilinearly; and a lower arcuate portion 21A3 connecting between a lower end side of the rectilinear portion 21A1 and the lower thick-walled portion outer peripheral surface 20A of the lower thick-walled portion 20 curvilinearly.

Denoted at 21B is the inner curved portion provided in the vertically intermediate portion of the inner peripheral surface of the circle member 18. This inner curved portion 21B is formed by cutting out a portion between the upper thick-walled portion inner peripheral surface 19B of the upper thick-walled portion 19 and the lower thick-walled portion inner peripheral surface 20B of the lower thick-walled portion 20 into a recessed groove shape over the entire circumference, and constitutes an inner peripheral surface of the hourglass-shaped thin-walled portion 21.

Here, the inner curved portion 21B is constituted by the rectilinear portion 21B1 located vertically intermediately and extending rectilinearly along the center line O-O of the plate thickness T of the circle member 18; an upper arcuate portion 21B2 connecting between an upper end side of the rectilinear portion 21B1 and the upper thick-walled portion inner peripheral surface 19B of the upper thick-walled portion 19 curvilinearly; and a lower arcuate portion 21B3 connecting between a lower end side of the rectilinear portion 21B1 and the lower thick-walled portion inner peripheral surface 20B of the lower thick-walled portion 20 curvilinearly.

In this instance, the upper arcuate portion 21A2 of the outer curved portion 21A and the upper arcuate portion 21B2 of the inner curved portion 21B are set to an equal radius of curvature, and the lower arcuate portion 21A3 of the outer curved portion 21A is set to a radius of curvature larger than that of the upper arcuate portion 21A2. On the other hand, the lower arcuate portion 21B3 of the inner curved portion 21B is set to a radius of curvature larger than that of the upper arcuate portion 21B2, and the lower arcuate portion 21A3 of the outer curved portion 21A is set to a radius of curvature larger than that of the lower arcuate portion 21B3 of the inner curved portion 21B.

Further, the outer curved portion 21A and the inner curved portion 21B are formed in a range in which they are substantially symmetrical about the center line O-O of the plate thickness T of the circle member 18. In the plate thickness t of the hourglass-shaped thin-walled portion 21, the thinnest portion is set by the rectilinear portion 21A1 of the outer curved portion 21A and the rectilinear portion 21B1 of the inner curved portion 21B.

Thus, the circle member 18 in accordance with this embodiment is arranged such that the outer curved portion 21A is provided over the entire circumference in the vertically intermediate portion of its outer peripheral surface, and the inner curved portion 21B is provided over the entire circumference in the vertically intermediate portion of its inner peripheral surface. In consequence, the hourglass-shaped thin-walled portion 21 having the smaller plate thickness t than the plate thickness T of the upper and lower thick-walled portions 19 and 20 is formed at the vertically intermediate portion of the circle member 18, so that the arrangement provided is such that the overall weight of the circle member 18 can be reduced by that portion.

On the other hand, the upper thick-walled portion outer peripheral surface 19A of the upper thick-walled portion 19 and the outer curved portion 21A of the hourglass-shaped thin-walled portion 21 are connected curvilinearly by the upper arcuate portion 21A2, while the lower thick-walled portion outer peripheral surface 20A of the lower thick-walled portion 20 and the outer curved portion 21A of the hourglass-shaped thin-walled portion 21 are connected curvilinearly by the lower arcuate portion 21A3. In consequence, the arrangement provided is such that it is possible to prevent the occurrence of localized stress concentration at boundary portions on the outer peripheral side between the hourglass-shaped thin-walled portion 21 and the respective upper and lower thick-walled portions 19 and 20.

In addition, the upper thick-walled portion inner peripheral surface 19B of the upper thick-walled portion 19 and the inner curved portion 21B of the hourglass-shaped thin-walled portion 21 are connected curvilinearly by the upper arcuate portion 21B2, while the lower thick-walled portion inner peripheral surface 20B of the lower thick-walled portion 20 and the inner curved portion 21B of the hourglass-shaped thin-walled portion 21 are connected curvilinearly by the lower arcuate portion 21B3. In consequence, the arrangement provided is such that it is possible to prevent the occurrence of localized stress concentration at boundary portions on the inner peripheral side between the hourglass-shaped thin-walled portion 21 and the respective upper and lower thick-walled portions 19 and 20.

Denoted at 22 is the outer weld bead which is formed at a joint portion between the outer peripheral side of the lower thick-walled portion 20 of the circle member 18 and the top plate 15 of the center frame 14. This weld bead 22 is formed annularly between the lower thick-walled portion outer peripheral surface 20A and the top plate 15 by fillet welding. Here, if it is assumed that a boundary portion between the lower arcuate portion 21A3 of the outer curved portion 21A and the lower thick-walled portion outer peripheral surface 20A is an upper stop end portion 22A, and a boundary portion with respect to the top plate 15 is a lower stop end portion 22B, the outer weld bead 22 is built up in a concavely curved shape or a triangular shape from the upper stop end portion 22A to the lower stop end portion 22B so as to continue to the lower arcuate portion 21A3.

Indicated at 23 is the inner weld bead which is formed at a joint portion between the inner peripheral side of the lower thick-walled portion 20 of the circle member 18 and the top plate 15 of the center frame 14. This weld bead 23 is formed annularly between the lower thick-walled portion inner peripheral surface 20B and the top plate 15 by fillet welding.

It should be noted that indicated at 24 is a disk-shaped grease bath disposed on the inner peripheral side of the circle member 18, and the grease bath 24 is secured to the upper thick-walled portion inner peripheral surface 19B of the upper thick-walled portion 19 by such a means as welding or the like. The grease bath 24 holds grease which lubricates meshing portions of inner teeth of the swing circle 3 mounted on top of the circle member 18 and a pinion (not shown) of a revolving apparatus for revolving the upper revolving structure 4.

Figure 5:
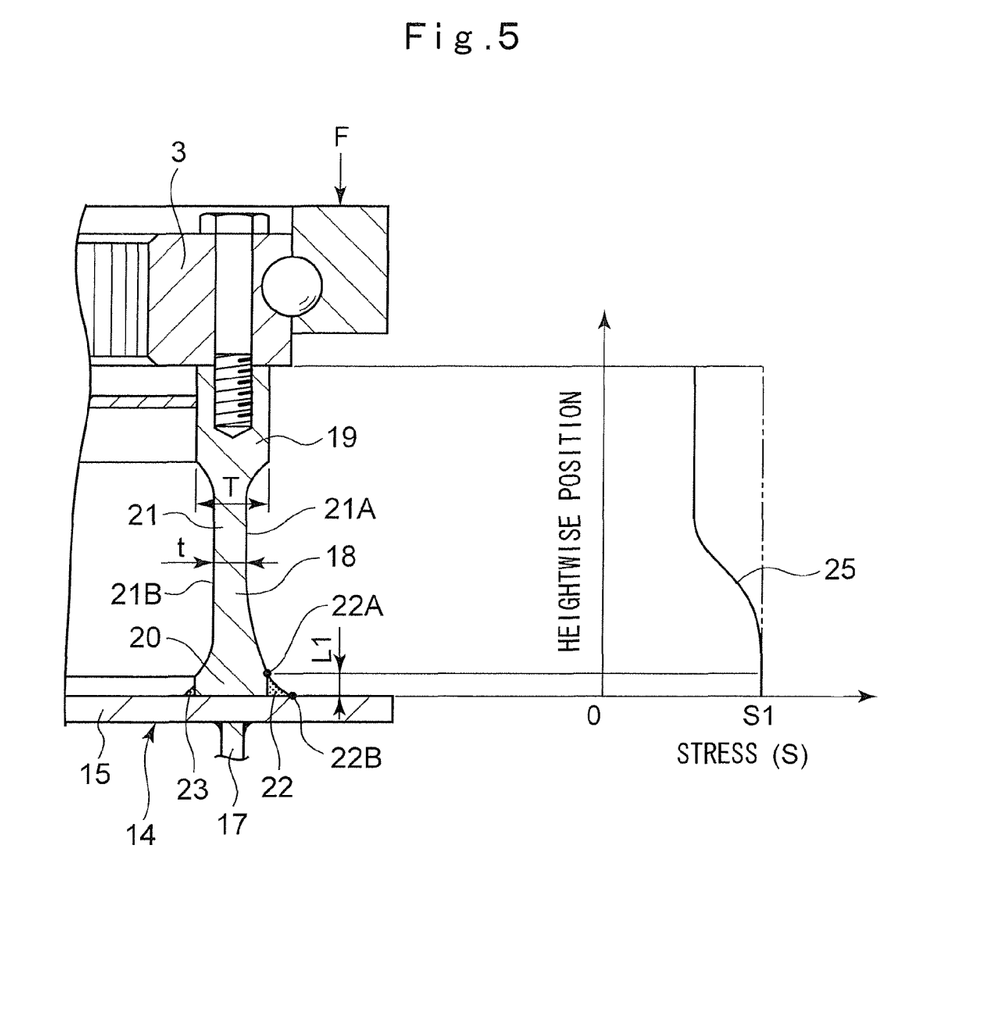
FIG. 5 is a stress distribution diagram illustrating the distribution of stress generated at respective vertical portions of a circle member in accordance with this embodiment.
Figure 6:
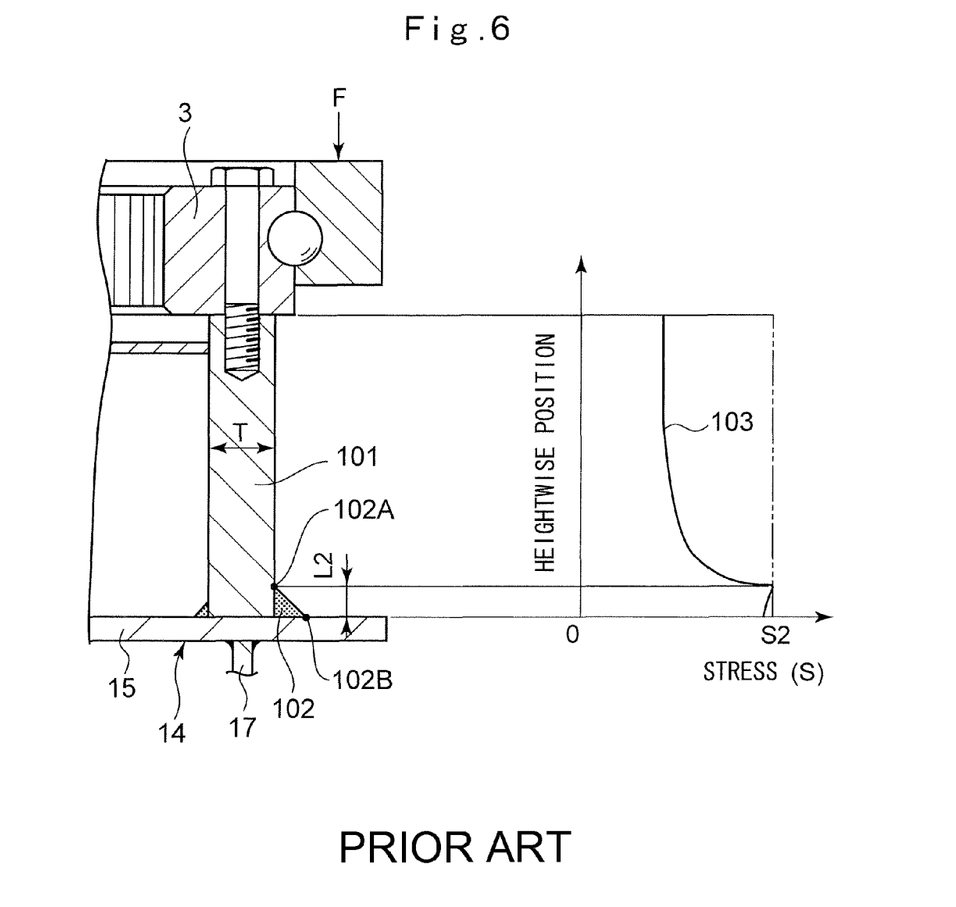
FIG. 6 is a stress distribution diagram illustrating the distribution of stress generated at respective vertical portions of a circle member in accordance with a comparative example.

Here, with reference to FIGS. 5 and 6, comparison between the circle member 18 in accordance with this embodiment and a circle member in accordance with a comparative example will be explained.

First, FIG. 5 shows the distribution of stress which is generated at respective vertical portions (heightwise positions) of the circle member 18 in accordance with this embodiment. In this instance, the circle member 18 in accordance with this embodiment is constituted by the upper and lower thick-walled portions 19 and 20 having the plate thickness T and the hourglass-shaped thin-walled portion 21 having the plate thickness t and enclosed by the outer curved portion 21A and the inner curved portion 21B. The lower thick-walled portion 20 of the circle member 18 is welded onto the top plate 15 of the center frame 14, and the weld beads 22 and 23 are formed at the joint portions between the lower thick-walled portion 20 and the top plate 15 over the entire circumference. Further, the circle member 18 is adapted to receive a downwardly-oriented load F as the weight and the like of the upper revolving structure 4 (see FIG. 1) is transmitted thereto through the swing circle 3 mounted on top of the upper thick-walled portion 19.

At this juncture, the stress generated at the respective vertical portions of the circle member 18 by the load F is shown by a stress distribution curve 25. This stress distribution curve 25 shows that a maximum stress S1 is generated in a range from the upper stop end portion 22A to the lower stop end portion 22B of the weld bead 22 formed between the outer peripheral surface of the lower thick-walled portion 20 and the top plate 15, namely, in a range of a vertical leg length L1 of the weld bead 22. In addition, it can be appreciated that the stress is kept so as to become gradually smaller in a range from the upper stop end portion 22A of the weld bead 22 to the upper end side of the circle member 18.

Thus, the circle member 18 in accordance with this embodiment is constructed such that the outer curved portion 21A and the inner curved portion 21B, which are formed by cutting out into a recessed groove shape over the entire circumference, is provided in its vertically intermediate portion. In consequence, when the downwardly-oriented load F is applied to the circle member 18, it is possible to minimize the stress from being concentrated at the upper stop end portion 22A of the weld bead 22 which is a joint portion between the circle member 18 and the top plate 15, and to disperse the stress to the outer curved portion 21A and the inner curved portion 21B of the circle member 18.

Next, FIG. 6 shows the distribution of stress which is generated at the respective vertical portions (heightwise positions) of a circle member 101 in accordance with the comparative example. In this instance, the circle member 101 in accordance with the comparative example is used in the prior art, and is formed as a cylindrical body having a vertically uniform plate thickness T from its upper end to its lower end. Here, the circle member 101 is welded onto the top plate 15 of the center frame 14, and a weld bead 102 is formed at a joint portion between the circle member 101 and the top plate 15 over the entire circumference. Further, the circle member 101 in accordance with the comparative example is adapted to receive the downwardly-oriented load F as the weight and the like of the upper revolving structure 4 is transmitted thereto through the swing circle 3 mounted on its upper end side.

In this case, the stress generated at respective vertical portions of the circle member 101 by the load F is shown by a stress distribution curve 103. This stress distribution curve 103 shows that a localized maximum stress S2 is generated at an upper stop end portion 102A of the weld bead 102 formed between the outer peripheral surface of the circle member 101 and the top plate 15. This maximum stress S2 is greater than the maximum stress S1 generated in the circle member 18 in accordance with this embodiment (S2>S1). In addition, a large stress having a value close to the maximum stress S2 is generated in a range from the upper stop end portion 102A to a lower stop end portion 102B of the weld bead 102, namely, in a range of a vertical leg length L2 of the weld bead 102. Meanwhile, it can be appreciated that the stress is kept so as to become gradually smaller in a range from the upper stop end portion 102A of the weld bead 102 to the upper end side of the circle member 101.

Namely, since the circle member 101 in accordance with the comparative example is formed as a cylindrical body having the vertically uniform plate thickness T, the stress cannot be dispersed with respect to the load F owing to the shape of the circle member 101, and the stress is unfavorably concentrated locally at the upper stop end portion 102A of the weld bead 102 which is the joint portion between the circle member 101 and the top plate 15.

Accordingly, with the circle member 101 in accordance with the comparative example, in order to enhance the joining strength between the lower end portion of the circle member 101 and the top plate 15, the leg length L2 of the weld bead 102 which is formed between the lower end portion of the circle member 101 and the top plate 15 needs to be formed so as to be as practically large as possible, and the surface of the weld bead 102 needs to be ground in a circular arc shape by using a grinder or the like. As a result, much time is expended in the operation of welding the circle member 101, so that its operational efficiency unfavorably deteriorates.

In contrast, with the circle member 18 in accordance with this embodiment, it is possible to minimize the occurrence of localized stress concentration at the upper stop end portion 22A of the weld bead 22 which is the joint portion between the lower thick-walled portion 20 and the top plate 15. As a result, the leg length L1 of the weld bead 22 which is formed over the entire circumference of the lower thick-walled portion 20 can be made as practically small as possible, thereby making it possible to enhance the operational efficiency at the time of welding the circle member 18.

Thus, according to the truck frame 11 in accordance with this embodiment, the arrangement provided is such that the outer curved portion 21A with a recessed groove shape is provided over the entire circumference in the vertically intermediate portion of the outer peripheral surface of the circle member 18 which is secured on top of the top plate 15 of the center frame 14 by using the welding means, and the inner curved portion 21B with a recessed groove shape is provided over the entire circumference in the vertically intermediate portion of the inner peripheral surface of the circle member 18. This makes it possible to make small the plate thickness t of the hourglass-shaped thin-walled portion 21 located in the vertically intermediate portion relative to the plate thickness T of the upper and lower thick-walled portions 19 and 20 located on both vertical end sides of the circle member 18. As a result, in this embodiment, the overall weight of the circle member 18 can be reduced in comparison with the circle member having the vertically uniform plate thickness as in the prior art.

Besides, as the outer curved portion 21A and the inner curved portion 21B, which are formed by cutting out into a recessed groove shape over the entire circumference, are provided in the vertically intermediate portion of the circle member 18, it is possible to minimize the occurrence of localized stress concentration at the joint portion between the lower end portion of the circle member 18 and the top plate 15 of the center frame 14 which are joined by using the welding means. Therefore, the leg length L1 of the weld bead 22 which is formed over the entire circumference between the lower end portion of the circle member 18 and the top plate 15 can be made as practically small as possible. As a result, it is possible to enhance the operational efficiency at the time of welding the lower end portion of the circle member 18 to the top plate 15, thereby making it possible to contribute to the reduction of the manufacturing cost of the truck frame 11.

Further, as the upper thick-walled portion 19 and the lower thick-walled portion 20 are provided on both vertical end sides of the circle member 18, respectively, and the hourglass-shaped thin-walled portion 21 is provided between these upper and lower thick-walled portions 19 and 20, the plate thickness T required for threadedly providing the bolt holes 19D for mounting the swing circle 3 can be secured at the upper end side (upper thick-walled portion 19) of the circle member 18. Thus, as the plate thickness T is set to be large on the upper end side and the lower end side of the circle member 18, and the plate thickness t of the vertically intermediate portion of the circle member 18 is set to be small, its weight can be reduced while sufficiently attaining its function as the circle member 18.

On the other hand, the outer curved portion 21A for forming the hourglass-shaped thin-walled portion 21 is constituted by the rectilinear portion 21A1, the upper arcuate portion 21A2, and the lower arcuate portion 21A3. Meanwhile, the inner curved portion 21B is constituted by the rectilinear portion 21B1, the upper arcuate portion 21B2, and the lower arcuate portion 21B3. In consequence, the plate thickness t of the hourglass-shaped thin-walled portion 21 can be set to be smallest at the position of the rectilinear portions 21A1 and 21B1 by the rectilinear portion 21A1 of the outer curved portion 21A and the rectilinear portion 21B1 of the inner curved portion 21B.

Further, the arrangement provided is such that the rectilinear portion 21A1 of the outer curved portion 21A and the upper and lower thick-walled portions 19 and 20 are connected curvilinearly by the upper and lower arcuate portions 21A2 and 21A3, and the rectilinear portion 21B1 of the inner curved portion 21B and the upper and lower thick-walled portions 19 and 20 are connected curvilinearly by the upper and lower arcuate portions 21B2 and 21B3. In consequence, it is possible to minimize the occurrence of localized stress concentration at the boundary portions between the hourglass-shaped thin-walled portion 21 and the upper and lower thick-walled portions 19 and 20. As a result, it is possible to ensure the overall strength of the circle member 18 in which the plate thickness T on the both vertical end sides is large and the plate thickness t at the vertically intermediate portion is small, thereby making it possible to enhance its reliability.

Furthermore, the weld bead 22 at the joint portion between the lower thick-walled portion outer peripheral surface 20A of the lower thick-walled portion 20 and the outer curved portion 21A is formed continuously to the outer curved portion 21A. In consequence, it is possible to minimize the concentration of stress with respect to the upper stop end portion 22A and the lower stop end portion 22B of the weld bead 22, thereby making it possible to enhance the joining strength of the circle member 18 with respect to the top plate 15.

It should be noted that, in the above-described embodiment, the case is illustrated in which the upper arcuate portion 21A2 of the outer curved portion 21A and the upper arcuate portion 21B2 of the inner curved portion 21B are set to an equal radius of curvature. However, the present invention is not limited to the same, and an arrangement may be adopted in which the upper arcuate portion 21A2 of the outer curved portion 21A and the upper arcuate portion 21B2 of the inner curved portion 21B are set to mutually different radii of curvature.

Besides, although, in the above-described embodiment, the case is illustrated in which the present invention is applied to the crawler type lower traveling structure 2 of the hydraulic excavator 1, the present invention is not limited to the same and may be applied extensively to construction machines having an upper revolving structure, such as a wheel type hydraulic excavator, a hydraulic crane, and the like.

DESCRIPTION OF REFERENCE NUMERALS

1: Hydraulic excavator (Construction machine)
3: Swing circle
11: Truck frame
12: Left side frame
13: Right side frame
14: Center frame
15: Top plate
16: Bottom plate
17: Connecting tubular body
18: Circle member
19: Upper thick-walled portion
20: Lower thick-walled portion
21: Hourglass-shaped thin-walled portion
21A: Outer curved portion
21B: Inner curved portion
21A1, 21B1: Rectilinear portion
21A2, 21B2: Upper arcuate portion
21A3, 21B3: Lower arcuate portion
22, 23: Weld bead

The invention claimed is:
1. A truck frame for a construction machine, said truck frame including left and right side frames and a center frame disposed between said side frames, comprising:
said center frame being constituted by a top plate and a bottom plate which are connected to said left and right side frames at an interval in a vertical direction, a connecting tubular body provided between intermediate portions in left and right directions of said top plate and said bottom plate to connect said top plate and said bottom plate, and a cylindrical circle member which is secured to an upper surface side of said top plate and on an upper end side of which a swing circle is mounted,
said circle member is formed such that its upper end side is formed as an upper thick-walled portion, its lower end side is formed as a lower thick-walled portion, each of said upper and lower thick-walled portions having a same plate thickness,
an outer curved portion is provided in an outer peripheral surface of said circle member, said outer curved portion being located between said upper thick-walled portion and said lower thick-walled portion and formed by cutting out a recessed groove shape over an entire circumference, an inner curved portion is provided in an inner peripheral surface of said circle member, said inner curved portion being located between said upper thick-walled portion and said lower thick-walled portion and is formed by cutting out a recessed groove shape over an entire circumference, and a portion between said upper thick-walled portion and said lower thick-walled portion is formed as an hourglass-shaped thin-walled portion having a smaller plate thickness than the plate thickness of said upper and lower thick-walled portions and enclosed by said outer curved portion and said inner curved portion.

2. A truck frame for a construction machine according to claim 1, wherein each of said outer curved portion and said inner curved portion is constituted by a rectilinear portion extending rectilinearly along a center line of a plate thickness of said circle member, an upper arcuate portion connecting between said rectilinear portion and said upper thick-walled portion curvilinearly, and a lower arcuate portion connecting between said rectilinear portion and said lower thick-walled portion curvilinearly.

3. A truck frame for a construction machine according to claim 1, wherein said lower thick-walled portion of said circle member and said top plate are welded by a welding means, and a weld bead at this joint portion is formed continuously with said outer curved portion.

* * * * *